(12) United States Patent
Wang et al.

(10) Patent No.: US 12,311,339 B2
(45) Date of Patent: May 27, 2025

(54) CARBON DIOXIDE ADSORBENT

(71) Applicant: Academia Sinica, Taipei (TW)

(72) Inventors: Jia-Hui Wang, New Taipei (TW);
Hao-Ju Chou, New Taipei (TW);
Po-Wen Chung, Taipei (TW)

(73) Assignee: ACADEMIA SINICA, Taipei (TW)

( * ) Notice: Subject to any disclaimer, the term of this patent is extended or adjusted under 35 U.S.C. 154(b) by 0 days.

(21) Appl. No.: 18/427,379

(22) Filed: Jan. 30, 2024

(65) Prior Publication Data

US 2024/0207814 A1   Jun. 27, 2024

Related U.S. Application Data

(62) Division of application No. 16/444,682, filed on Jun. 18, 2019, now Pat. No. 11,918,975.

(51) Int. Cl.
*B01J 20/20* (2006.01)
*B01D 53/02* (2006.01)
(Continued)

(52) U.S. Cl.
CPC .............. *B01J 20/20* (2013.01); *B01D 53/02* (2013.01); *B01J 20/28059* (2013.01); *B01J 20/3071* (2013.01); *B01J 20/3078* (2013.01); *B01J 20/3085* (2013.01); *B01J 27/02* (2013.01); *B01J 31/04* (2013.01); *B01J 37/20* (2013.01); *C01B 32/318* (2017.08); *C01B 32/354* (2017.08); *B01D 2253/102* (2013.01); *C01P 2002/72* (2013.01); *C01P 2002/76* (2013.01);
(Continued)

(58) Field of Classification Search
CPC .... B01J 20/20; B01J 20/3078; B01J 20/3071; B01J 20/28059; C01B 32/318; C01B 32/354; H01M 10/00
See application file for complete search history.

(56) References Cited

U.S. PATENT DOCUMENTS

2016/0039678 A1   2/2016   Tanimola

FOREIGN PATENT DOCUMENTS

| CN | 107108219 A | 8/2017 |
|---|---|---|
| CN | 109509570 A | 3/2019 |
| JP | 4936588 B2 * | 5/2012 |

OTHER PUBLICATIONS

Nagata et al., Carbon Fiber For Metal Oxide Coating And Method For Producing The Same, May 2012, See the Abstract. (Year: 2012).*

(Continued)

*Primary Examiner* — Anca Eoff
*Assistant Examiner* — Monique M Wills
(74) *Attorney, Agent, or Firm* — Muncy, Geissler, Olds & Lowe, P.C.

(57) ABSTRACT

Disclosed is a modified carbonaceous material, which includes hexagonal carbon networks in a layered stacking structure and acidic functional groups bonded to the hexagonal carbon networks and mainly existing at edges of the layered carbonaceous structure. Accordingly, the close proximity of acid moiety at the edges can resemble the center of hydrolysis enzymes, resulting in enhancement of hydrolytic efficiency. Additionally, the acid-functionalized carbonaceous material can also be applied in the capture and storage of carbon dioxide due to its unexpectedly higher capacity for $CO_2$ molecular.

9 Claims, 8 Drawing Sheets

(51) Int. Cl.
  *B01J 20/28*  (2006.01)
  *B01J 20/30*  (2006.01)
  *B01J 27/02*  (2006.01)
  *B01J 31/04*  (2006.01)
  *B01J 37/20*  (2006.01)
  *C01B 32/318* (2017.01)
  *C01B 32/354* (2017.01)

(52) U.S. Cl.
  CPC ...... *C01P 2002/78* (2013.01); *C01P 2002/82* (2013.01); *C01P 2002/85* (2013.01)

(56) References Cited

OTHER PUBLICATIONS

Wang et al., "Surface Modification and Characterization of Carbonaceous Materials and its Application on Catalytic Hydrolysis of Biomass-derived Polysaccharides" (Poster presentation: Jun. 28-29, 2018, 36th Taiwan Symposium on Catalysis and Reaction Engineering conference) 4 pages.

Chou et al., "Understanding the Surface Modification of Heterogeneous Catalyst for Hydrolytic Depolymerization of Cellulose: Correlation among Average Molecular Weight, Crystallinity of Polysaccharides and Hydrolytic Efficiency" (Poster presentation: Aug. 5-10, 2018, TOCAT8 conference) 62 pages.

Jia-Hui Wang, "Surface Modification and Characterization of Carbonaceous Materials and its Application on Catalytic Hydrolysis of Biomass-derived Polysaccharides" (Master Thesis: Jul. 17, 2018 (Orals Date); only abstract was published online "National Taiwan Normal University Electronics Theses & Dissertations") 3 pages.

Nagata, Carbon Fiber for Metal Oxide Coating and Method For Poducing The Same, See the Abstract (Year:2012).

Jin. In A Surface Modified Preparation Method of Graphene Modified Carbon Electrode, See the Abstract (Year:2019).

* cited by examiner

CARBON DIOXIDE ADSORBENT

CROSS REFERENCE TO RELATED APPLICATION

This application is a division of pending U.S. patent application Ser. No. 16/444,682 filed Jun. 18, 2019. The entirety of said application is incorporated herein by reference.

BACKGROUND OF THE INVENTION

1. Field of the Invention

The present invention relates to a carbon dioxide adsorbent and, more particularly, to a carbon dioxide adsorbent having functional groups at edges of a layered carbonaceous structure.

2. Description of Related Art

Carbonaceous materials have been applied in various research fields of traditional and novel technologies. For example, porous carbonaceous materials have been extensively studied in the field of $CO_2$ capture. Among various solid adsorbents, porous carbonaceous materials have received much attention because of their desirable physical and chemical properties, such as low cost, variety of form, ease of processability, controllable porosity and tailored surface chemistry.

Additionally, the possibility of using carbonaceous materials as catalysts for various reactions has been studied by several researchers. Carbonaceous catalysts are environmentally benign and could provide a cost-competitive advantage. In particular, tunable surface properties of carbonaceous materials and excellent physical properties are compatible with diverse catalysis reactions. For example, the modification of acidic functional groups on carbon surface has been studied in cellulose hydrolysis, such as mesoporous carbon (CMK-3) with acid sites density of 0.41 mmol $g^{-1}$, and oxygenated alkali activated carbon (K26) containing acid sites density of 0.88 mmol $g^{-1}$. However, the hydrolytic efficiency of those acidic functional carbon-based materials still leaves something to be desired.

For the reasons stated above, and for other reasons stated below, an) urgent need exists to develop a new surface-modified carbonaceous material that can address hydrolytic efficiency concerns and/or have great potential in other various applications.

SUMMARY OF THE INVENTION

An objective of the present invention is to provide a carbonaceous material with high surface coverage of acid functional groups that is capable of being employed in cellulose hydrolysis or/and other applications. The acid functional groups mainly exist on the edges of layered carbonaceous structure so that the close proximity of acid moiety on the layered structure can resemble the center of hydrolysis enzymes (such as glycosidase), resulting in enhancement of hydrolytic efficiency. Additionally, the acid-functionalized carbonaceous material can also be applied in the capture and storage of carbon dioxide due to its unexpectedly higher capacity for $CO_2$ molecular.

In accordance with the foregoing and other objectives, the present invention provides a modified carbonaceous material, comprising hexagonal carbon networks in a layered stacking structure and acidic functional groups bonded to the hexagonal carbon networks, wherein a majority of the acidic functional groups are covalently linked to in-plane $sp^2$ carbons at edges of the hexagonal carbon networks. Specifically, in the present invention, all or plural ones of the acidic functional groups are covalently linked to the $sp^2$ carbons at edges of the hexagonal carbon networks, wherein the plural ones of the acidic functional groups at the $sp^2$ carbons of the hexagonal carbon networks are greater in quantity than others covalently linked to $sp^3$ carbons of the hexagonal carbon networks.

By investigating the correlation between the acidic functional groups and the hexagonal carbon networks based on solid $^{13}C$ DP/MAS solid-state NMR (ssNMR), Raman spectroscopy and X-ray photoelectron spectroscopy, it can be recognized that the acidic functional groups mainly exist on edges of the hexagonal carbon networks: (i) substantially no or a weak $sp^3$ carbon peak ($\delta$ 22 ppm) in $^{13}C$ solid-state NMR; (ii) $I_D/I_G$ band ratio of not larger than 1 (even not larger than 0.9) as measured by Raman spectroscopy; and (iii) C1s/O1s ratio of not less than 3 (even not less than 4) as measured by X-ray photoelectron spectroscopy.

In the present invention, the modified carbonaceous material may be prepared by acid modification of a pitch-based material, such as mesophase pitch (MP), to form the acidic functional groups mainly on edges of aromatic planes in the layered stacking structure. Accordingly, a series of nonporous carbonaceous material with high density of acid functional groups can be synthesized and exhibit enhanced catalytic efficiency in cellulose hydrolysis. Specifically, in accordance with a preferred embodiment, the modified carbonaceous material is identified to have a specific surface area of lower than 56 $m^2/g$ as measured by nitrogen adsorption and a total acid site density of about 1.5 mmol/g or more (e.g. 1.5 to 4.0 mmol/g) higher than mesoporous carbon (CMK-3) and oxygenated alkali activated carbon (K26).

In the present invention, the modified carbonaceous material can have an interlayer spacing in a range of from about 0.34 nm to about 0.37 nm as measured by X-ray diffraction. Accordingly, the close proximity of the acidic functional groups on the edges can resemble the center of hydrolysis enzymes, resulting in better hydrolytic efficiency.

In the present invention, the pitch-based material, including the hexagonal carbon networks, may be treated with sulfuric acid, nitric acid or hypochlorite salt, optionally followed by hydrothermal treatment. Accordingly, the pitch-based material can be modified with high surface coverage of the acidic functional groups (e.g. sulfonic, carboxyl, lactone and phenolic hydroxyl groups) mainly on the edges of layered structure.

In accordance with the aspect of sulfuric acid treatment, substantially all of the acidic functional groups are covalently linked to in-plane $sp^2$ carbons at the edges of the hexagonal carbon networks that substantially consist of aromatic carbons. As a result, substantially no $sp^3$ carbon peak is observed in $^{13}C$ CP/MAS NMR spectrum of the sulfuric-treated carbonaceous material. This indicates that the sulfuric-treated carbonaceous material has substantially no aliphatic carbons therein. After acid modification with sulfuric acid, the modified carbonaceous material may have the total acid site density of about 2.0 mmol/g or more (e.g. 2.0 to 3.5 mmol/g). The densities of sulfonic groups, phenolic hydroxyl groups, carboxyl groups and lactone groups included in the sulfuric-treated carbonaceous material may be about 0.8 mmol/g or more (e.g. 0.8 to 1.5 mmol/g), about 0.5 mmol/g or more (e.g. 0.5 to 0.8 mmol/g), about 0.1 mmol/g or more (e.g. 0.1 to 0.3 mmol/g), and about 0.4 mmol/g or more (e.g. 0.4 to 0.9 mmol/g), respectively. In an embodiment of the present invention, the sulfuric-treated carbonaceous material is demonstrated to have an $I_D/I_G$ ratio of about 0.7 to about 0.9 and a C1s/O1s ratio of about 4.0 to about 6.0.

In accordance with the alternative aspect of nitric acid or hypochlorite salt treatment, the acidic functional groups are not only modified at the edges of the material but also partially on benzene ring. As a result, a weak $sp^3$ carbon peak is observed in $^{13}$C CP/MAS NMR spectra of the nitric- and hypochlorite-treated carbonaceous material. After acid modification with nitric acid or hypochlorite salt, the modified carbonaceous material may have the total acid site density of about 1.5 mmol/g or more (e.g. 1.5 to 2.5 mmol/g). The densities of phenolic hydroxyl groups, carboxyl groups and lactone groups included in the nitric- or hypochlorite-treated carbonaceous material may be about 0.3 mmol/g or more (e.g. 0.3 to 0.8 mmol/g), about 0.2 mmol/g or more (e.g. 0.2 to 1.5 mmol/g), and about 0.3 mmol/g or more (e.g. 0.3 to 0.9 mmol/g), respectively. In an embodiment of the present invention, the nitric- or hypochlorite-treated carbonaceous material is demonstrated to have an $I_D/I_G$ ratio of about 0.9 to about 1.0 and a C1s/O1s ratio of about 3.0 to about 4.0.

In view of the good catalytic efficiency of the modified carbonaceous material in cellulose hydrolysis, the present invention further provides a method for cellulose hydrolysis, comprising: mixing the aforementioned modified carbonaceous material and a cellulose in an aqueous solution; and hydrolyzing the cellulose at a predetermined temperature in the presence of the modified carbonaceous material as a catalyst. The predetermined temperature may range from 130° C. to 210° C. In an embodiment of the present invention, it is demonstrated that the modified carbonaceous material can depolymerize cellulose (such as crystalline cellulose, amorphous cellulose, and pre-hydrolytic cellulose) with a catalytic ratio of 4.8 mol % (acid groups/cellulose). Only lower than 3 mol % of glucose yield could be observed during the hydrolytic reaction of leaching sulfonic groups. Accordingly, it can be recognized that the modified carbonaceous material of the present invention exhibits hydrolytically stable, which could lead the entire catalytic processes more effectively and eco-friendly.

In the present invention, it is demonstrated that modified base functionality through neutralization of acid groups and this base functionalized surface can isomerize glucose to fructose up to 90% selectivity and it showed that conjugate base could be used as base catalyzed isomerization of glucose.

Moreover, based on $CO_2$ adsorption analysis, it can be recognized that the acid-functionalized material of the present invention has potential in $CO_2$ sequestration. Accordingly, the present invention further provides a $CO_2$-capturing acid-functionalized adsorbent, comprising hexagonal carbon networks in a layered stacking structure and acidic functional groups bonded to the hexagonal carbon networks, wherein the hexagonal carbon networks substantially consist of aromatic carbons, and substantially all of the acidic functional groups are covalently linked to in-plane $sp^2$ carbons at edges of the hexagonal carbon networks. In an embodiment of the present invention, it is demonstrated that the modified carbonaceous material of the present invention exhibits high carbon dioxide uptake up to about 11 wt %.

As used here and in the appended claims, the phrase "a majority of the acidic functional groups" refers to a percentage of the number of the acidic functional groups in the material. That is, more than 50% of the acidic functional groups present in the material are modified at the edges of the material. For instance, at least 60% of the acidic functional groups present in the material may be modified at the edges of the material. For instance, at least 70% of the acidic functional groups present in the material are modified at the edges of the material. For instance, at least 80% of the acidic functional groups present in the material are modified at the edges of the material. For instance, at least 90% of the acidic functional groups present in the material are modified at the edges of the material.

The foregoing and other objects, advantages, and novel features of the invention will become more apparent from the following detailed description when taken in conjunction with the accompanying drawings.

DETAILED DESCRIPTION OF THE PREFERRED EMBODIMENT

Examples—Preparation of Functionalized Mesophase Pitch

Mesophase pitch (softening point: 275-295° C., Mitsubishi Gas Chemical, Japan) was ground and meshed in 230 mesh screens, to a particle size of 63 microns prior to further treatment and reactions.

[MP-$SO_3H$]

The functional mesophase pitch material ($SO_3H$-MP) was synthesized by using concentrated $H_2SO_4$ (95-97% of $SO_3$) solution as an oxidizing agent. The mesophase pitch (1.2 g) was sulfonated by heating in concentrated sulfuric acid at 80° C. for 20 hours and subsequently at 150° C. for 7 hours under a dry nitrogen atmosphere. After the reaction, the functional MPs were collected via filtration and washed with copious amounts of water. The materials were treated for Soxhlet extraction with 500 mL of water for a period of 8 hours, and this extraction procedure was repeated two times. Finally, the modified material was placed in a freeze dryer to dry.

[MP-SO$_3$H-HT]

MP-SO$_3$H-HT was produced by three repetitions of hydrothermal treatment of MP-SO$_3$H. MP-SO$_3$H (0.5 g) was placed in an autoclave with 30 mL of water at 200° C. for 8 hours. After hydrothermal treatment, the material was collected by filtration and washed by the Soxhlet extraction procedure. The same step was repeated for two times to synthesize MP-SO$_3$H-HT.

[MP-COOH]

To synthesize MP-COOH, 500 mg of MPs were placed in a 100 mL round-bottom flask with 50 mL of varying concentrations (7.9 M, 7 M, 6 M, 5 M, 4 M or 1 M) of nitric acid. The solution was then refluxed at 105° C. for 1.5 or 3 hours. After the reaction, the functional MPs were collected via filtration and washed with copious amounts of water. The resulting materials were treated for Soxhlet extraction with 500 ml of water for a period of 8 hours, repeated two times. Finally, the modified material was placed in a freeze dryer to dry. Among the various reaction conditions, 6M for 1.5 hours was considered to be a condition for the optimization of carboxylic acid groups. Thus, the MP-COOH synthesized under the reaction conduction of 6M for 1.5 hours was subjected to the following analysis.

Additionally, MP-COOH can also be prepared by modification of pre-treated materials: MPs (300 mg) was calcined under different gases (the nitrogen and air) at a 250° C. or 280° C. for 2, 4 or 6 hours, followed by adding 30 mL of nitric acid (7.9M, 7M, 6M, 5M, 4M or 1M) at 105° C. for 1.5 hours or 3 hours.

[MP-Oxy]

To synthesize MP-Oxy, 500 mg of MPs were placed in a 500 mL round-bottom flask with 250 mL of 5% sodium hypochlorite, and the pH adjusted to about 4-5 with 37% concentrated hydrochloric acid at 30° C. for 12, 18 or 24 hours. After the reaction, the functional MPs were collected via filtration and washed with copious amounts of water. The resulting materials were treated for Soxhlet extraction with 500 mL of water for a period of 8 hours, repeated two times. Among the MP-Oxy materials synthesized under the various reaction times, the one treated for 24 hours was selected for subsequent analysis. Optionally, after acid modification, hydrothermal treatment may be performed once for repairing the structure of the MP-Oxy material to obtain MP-Oxy-HT.

Comparative Example—Preparation of MCN—HSO$_3$

The functional msoporous carbon nanoparticle material (HSO$_3$-MCN) was synthesized by using fuming H$_2$SO$_4$ (20% of SO$_3$) solution as an oxidizing agent. MCN materials (1.2 g) were treated in fuming sulfuric acid solution (80 mL) in a round-bottom flask (50 mL), and the mixture was heated under nitrogen at 80° C. for 24 h. After reaction, the as-synthesized functional MCN were collected via filtration and washed with copious amounts of water. The as-synthesized MCN material (1.2 g) was Soxhlet extracted with 250 mL water for a period of 3 h, and this extraction procedure was repeated four consecutive times.

Nitrogen Gas and Carbon Dioxide Gas Sorption Isotherms

Nitrogen gas (N$_2$) and carbon dioxide gas (CO$_2$) sorption isotherms of samples were analyzed using Micromeritics 3Flex analyzer under a $1 \times 10^{-6}$ mmHg vacuum level. The isotherms of N$_2$ sorption were analyzed at relative pressure (P/P$_0$) between 0.05 and 0.995 and at liquid nitrogen temperatures (77 K), and the Brunauer-Emmett-Teller (BET) specific surface area was derived at the range of relative pressure (P/P$_0$) between 0.05 and 0.3. The CO$_2$ sorption isotherms were analyzed at relative pressure (P/P$_0$) between 0.0003 and 0.03 and at 273 K (P$_0$=26,142 mmHg) and 298 K (P$_0$=48,273 mmHg). The analysis temperature for CO$_2$ was achieved using Micromeritics ISO controller within 0.1° C. Samples (50 mg) were initially degassed using Micromeritics Smart VacPrep degasser at 393 K for 12 hours, under a $1 \times 10^{-3}$ mmHg vacuum level. The free space of sample tubes were determined using helium gas (He) with a purity of 99.996%. The nitrogen gas (N$_2$) sorption isotherms of samples were shown in FIGS. 1 and 2, whereas the carbon dioxide gas (CO$_2$) sorption isotherms of samples were shown in FIG. 3.

Figure 1:
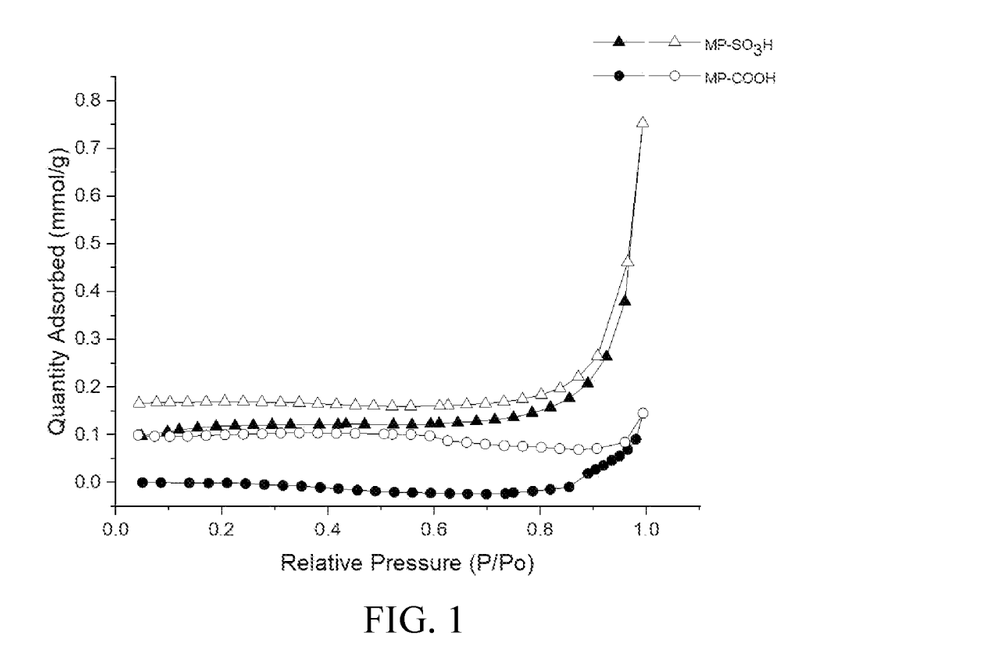
FIGS. 1 and 2 show nitrogen gas sorption isotherms of MP-based materials.
Figure 2:
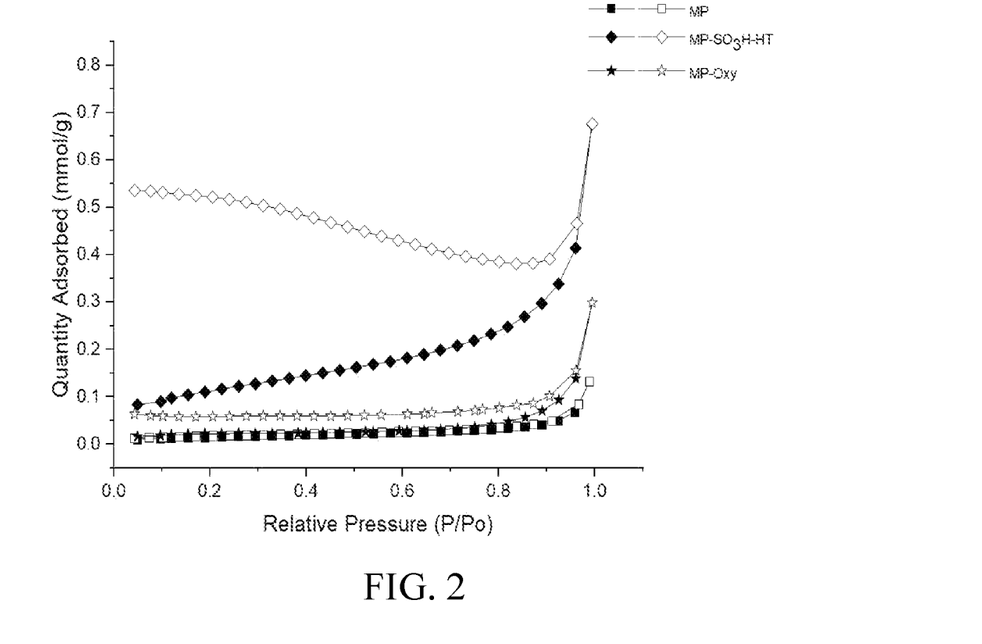
Figure 3:
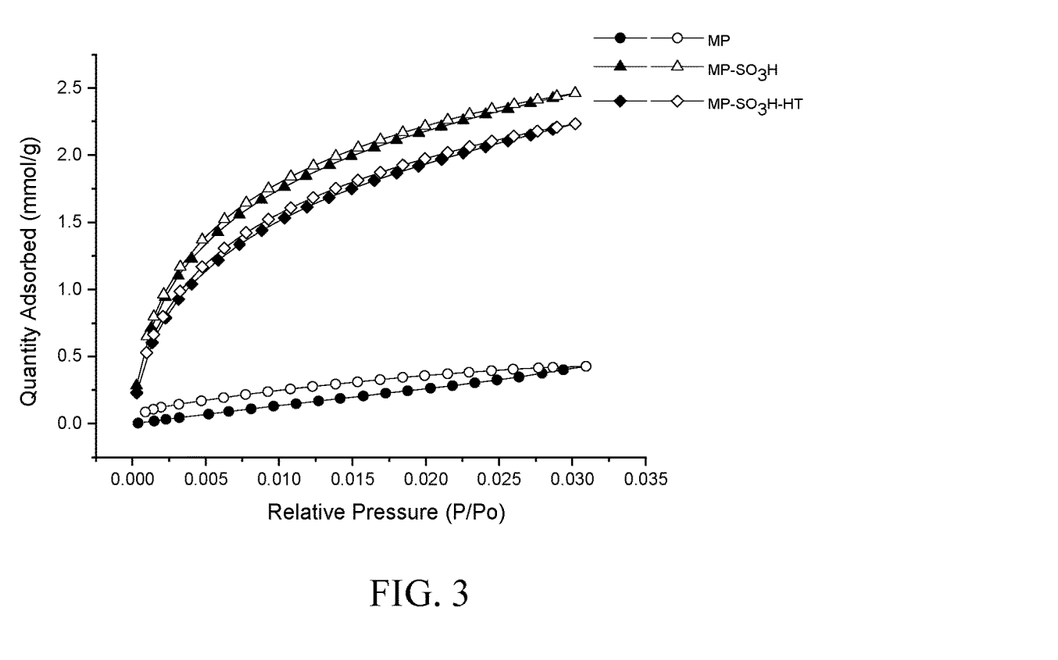
FIG. 3 shows carbon dioxide gas sorption isotherms of MP-based materials.

The results showed that the surface areas of all materials were relatively lower than other porous materials (surface area: 55.2 m$^2$/g for MP-HSO$_3$, 25.2 m$^2$/g for MP-HSO$_3$—HT, 2.18 m$^2$/g for MP-COOH, 1.56 m$^2$/g for MP-Oxy). This indicated that functional MPs were nonporous materials. Surprisingly, in the linear gas molecule (CO$_2$) physical sorption study at 273K, MP-SO$_3$H and MP-SO$_3$H-HT exhibited high CO$_2$ adsorption capacity (2.46 mmol/g for MP-SO$_3$H, 2.23 mmol/g for MP-SO$_3$H-HT) with the isotherm exhibited type (II). The CO$_2$ physically adsorption in considerable quantity observed in MP-SO$_3$H and MP-SO$_3$H—HT is surprising because it contradicts the concept of CO$_2$ sequestration by using the materials with the high surface or possessing base functionality.

Identification of Acid Sites Density

Acid site determination was carried out based on Boehm's method, and elemental analysis was used to analyze the sulfur and expressed as a sulfonic. In order to determine functional groups such as carboxyl, lactone and phenolic hydroxyl groups, Boehm selective neutralization of each functionality used different base solutions: sodium hydroxide (NaOH) for all of three functionalities; sodium carbonate (Na$_2$CO$_3$) for carboxyl and lactone; sodium bicarbonate (NaHCO$_3$) only for carboxylic acid. All acid and base solutions (HCl, NaOH, Na$_2$CO$_3$, and NaHCO$_3$, KHP) were prepared in the concentration of 0.01M. Since NaOH concentration is easily changed due to exposure with CO$_2$ in the air, potassium hydrogen phthalate was used to cross-check the concentration of the prepared sodium hydroxide. The obtained concentration value was used as the sodium hydroxide concentration. Afterward, HCl was titrated with NaOH to determine HCl concentration. Finally, Na$_2$CO$_3$ and NaHCO$_3$ concentrations were checked by using HCl. Phenolphthalein was used as an indicator for NaOH solution, and bromocresol green as an indicator for Na$_2$CO$_3$ and NaHCO$_3$ solutions, respectively.

Boehm titration was conducted in the following manner: 50 mg of material (MP-based) was added to 20 mL of each base solution (NaOH·Na$_2$CO$_3$, and NaHCO$_3$) in a 50 mL tube. All three samples were vortexed for 2 hours and then filtered to recover the solution. Afterwards, the recovered solutions from each base was titrated with HCl. Acid sites were determined from the corresponding titrated base solution with HCl. Carboxylic acid, combination of carboxyl and lactone, and total acid sites were calculated by using NaHCO$_3$, Na$_2$CO$_3$ and NaOH, respectively. Phenol density was calculated from the difference between the density determined by NaOH and Na$_2$CO$_3$. The following equation was used to calculate the acid sites of each group:

$$\text{Acid site} = \frac{(M_{Base} \times 20 \text{ mL}) - (M_{HCl} \times v)}{\text{catalyst amount } (g)}.$$

The results of the study showed that the MP-HSO$_3$—HT had lower total acid site (2.25 mmol/g) than that of MP-HSO$_3$ (3.12 mmol/g) because the functional groups of MP-HSO$_3$—HT were removed via hydrothermal treatment. Additionally, the total acid site of MP-COOH (2.00 mmol/g) was lower than that of MP-HSO$_3$ or MP-HSO$_3$—HT, indicating that the oxidation of nitric acid was not as good as sulfuric acid, and the total acidity of MP-Oxy (1.96 mmol/g) was the lowest among all materials.

The distribution of acid sites of untreated MP and functionalized MPs is shown in Table 1.

TABLE 1

| sample | Sulfonic Group [a] (mmol/g) | Carboxyl Group (mmol/g) | Lactones Group (mmol/g) | Phenols Group (mmol/g) |
|---|---|---|---|---|
| MP | 0.0965 | 0.02275 | — | 0.089 |
| MP-HSO$_3$ | 1.50 | 0.27 | 0.84 | 0.56 |
| MP-HSO$_3$-HT | 0.88 | 0.12 | 0.50 | 0.77 |
| MP-COOH | — | 1.28 | 0.35 | 0.37 |
| MP-Oxy | — | 0.28 | 0.88 | 0.76 |

[a] Sulfur content was determined by elemental analysis

Powder X-Ray Diffraction (PXRD)

The powder XRD spectra were recorded in this experiment by a Bruker D8 Advance spectrometer operating at a voltage of 40 kW and a current of 40 mA generated with Cu Kα radiation (λ=1.5418 Å). The scan angle is 10° to 90° with the scan rate of 6°/minute.

The XRD pattern of the MP-based materials show a peak at a 2θ angle of 24°-25°, which can be interpreted as the (002) plane of the amorphous carbon structure. Compared to strong intensity peak of the unmodified MP, the modified materials showed broad, weak peaks at the same angle, indicating that the crystal phase was weakened by the oxidation treatment and the stacking of layered structures was random.

Additionally, the d-spacing (distance of its interlayer structure) of all materials calculated by Bragg's law 2d(hkl) sin θ=nλ was shown as follows: 0.366 nm (MP-HSO$_3$), 0.366 nm (MP-HSO$_3$—HT), 0.343 nm (MP-COOH), and 0.345 nm (MP-Oxy).

Fourier-Transform Infrared Spectroscopy (FTIR)

Figure 4:
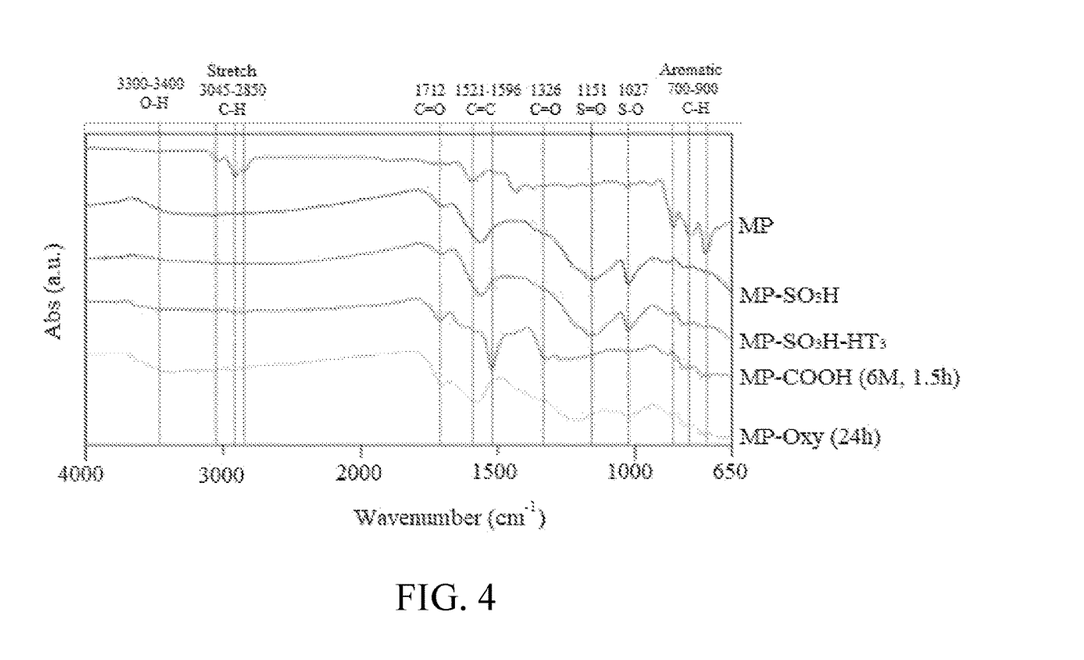
FIG. 4 shows FTIR spectra of MP-based materials.

The FTIR spectra of functionalized MP materials were shown in FIG. 4. The bands at 1027 cm$^{-1}$ and 1151 cm$^{-1}$ on MP-SO$_3$H and MP-SO$_3$H-HT are assigned to asymmetric and symmetric stretching of S—O and S=O of sulfonic groups SO$_3$H. The band at 1326 cm$^{-1}$ is assigned to the C—O stretching. The band at 1521-1596 cm$^{-1}$ are attributable to C=C stretching mode of graphitic structure. The band at 1712 cm$^{-1}$ is assigned to the C=O stretching mode of carboxylic acid groups. Furthermore, the broad band between 2850-3045 cm$^{-1}$ is assigned to the C—H stretching modes, and the band attributed to the OH groups of the carboxylic acid and phenolic acid is located at 3300-3400 cm$^{-1}$.

$^{13}$C Solid-State NMR (SSNMR)

Figure 5:
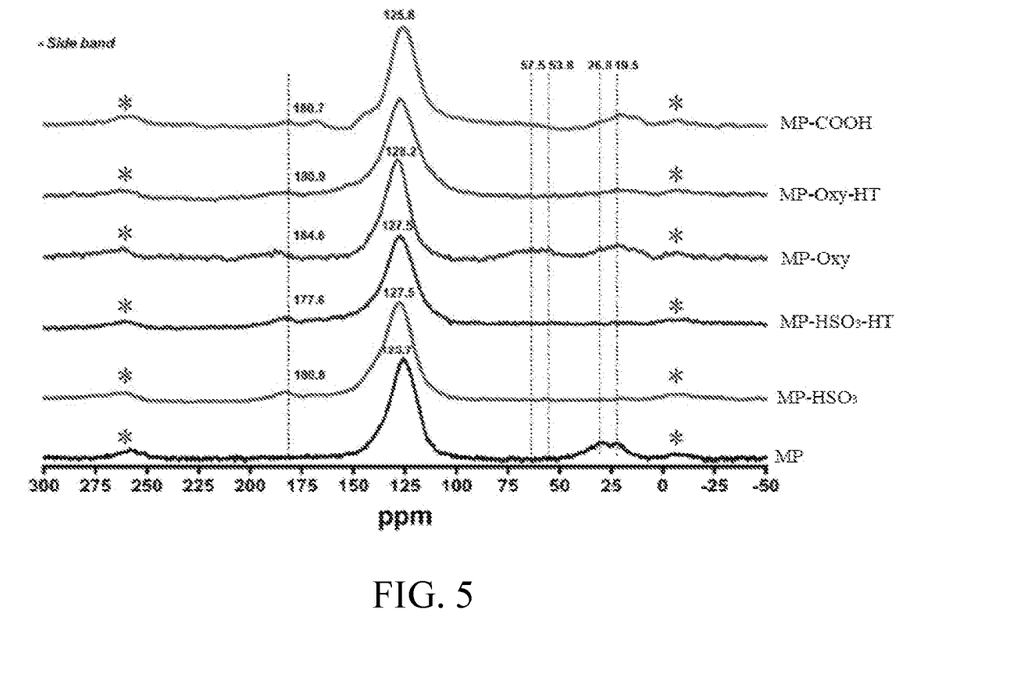
FIG. 5 shows solid-state NMR analysis of MP-based materials.

The $^{13}$C DP-mass rotation ($^{13}$C DP-MAS) spectrum was shown in FIG. 5. There were two prominent peaks centered at a chemical shift of 22 ppm and 125 ppm for the MP spectrum, which indicated that two major chemical compositions, aliphatic carbon and aromatic carbon. In the MP-SO$_3$H and MP-SO$_3$H-HT spectra, the aliphatic carbon peak was obviously not observed, while the aromatic carbon peak shifted a bit downfield with a new peak centered at chemical shift 180 ppm, which could represent the oxidized group, such as carboxylic acid. The chemical shift of the aromatic carbon adjacent to sulfonic acid may have merged around 130 ppm, becoming indistinguishable amongst other aromatic carbons. In addition to the above performance, MP-COOH and MP-Oxy can also be found to still have aliphatic carbon peaks, with MP-Oxy having a new peak at a chemical shift of 57 ppm. According to the literature, it is an O-alkyl-C group. The results above confirmed that modification of the acidic functional groups mostly occur on the edge of the materials, while MP-COOH and MP-Oxy have a little acidic functional groups modified on the benzene ring.

X-ray Photoelectron Spectroscopy (XPS)

Figure 6:
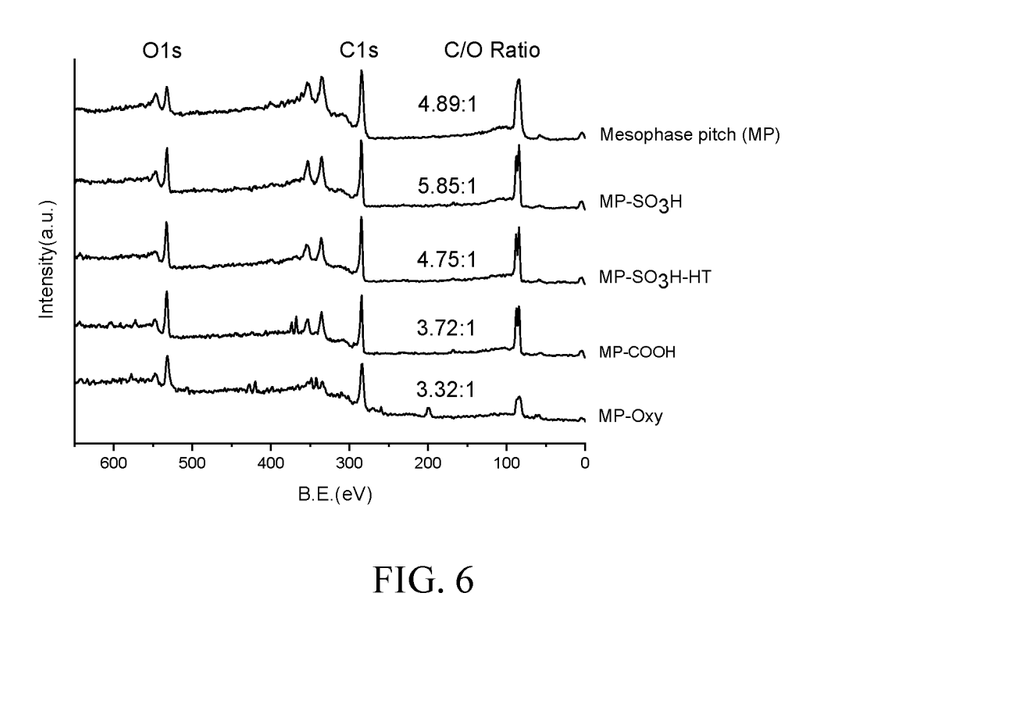
FIG. 6 shows XPS analysis of MP-based materials.

The analysis of XPS was shown in FIG. 6. The calculation of the C/O ratio was given by: [(Integrated area of C1$_S$)/(sensitive factors of C1$_S$)/(Integrated area of O1$_S$)/(sensitive factors of O1$_S$)]. The analysis results indicated that the C/O ratio of the unfunctionalized material MP was 4.89, while the C/O ratio of the functional materials MP-SO$_3$H, MP-SO$_3$H—HT, MP-COOH, and MP-Oxy were 5.85, 4.75, 3.72, and 3.32, respectively. The higher ratio of MP-SO$_3$H was attributed to that most of the functional groups were modified on the edge. For MP-SO$_3$H-HT, as the hydroxyl group replaced the sulfonated group after hydrothermal treatment, the ratio of MP-SO$_3$H-HT decreased. The functional groups of MP-COOH and MP-Oxy were not only modified at the edge of the material but also partially modified on the benzene ring, resulting in lower C/O ratio.

Raman Spectroscopy

Figure 7:
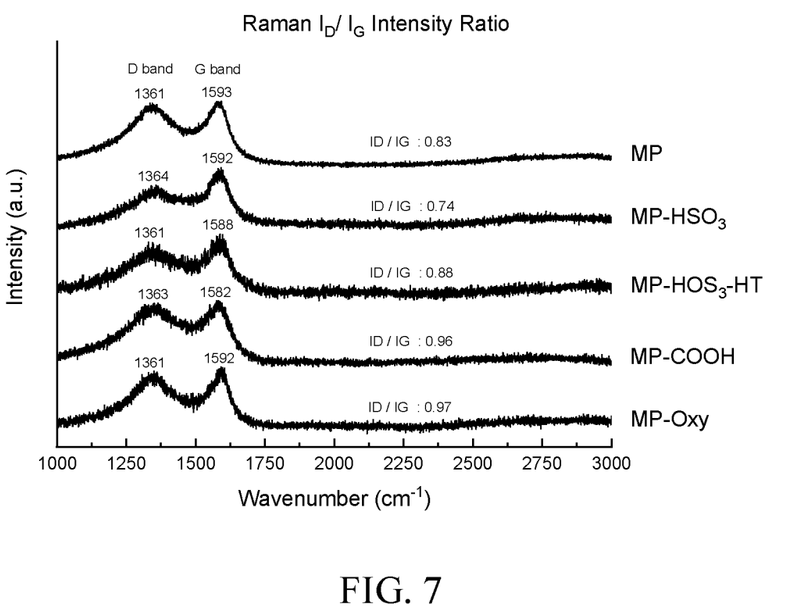
FIG. 7 shows Raman analysis of MP-based materials.
Figure 8:
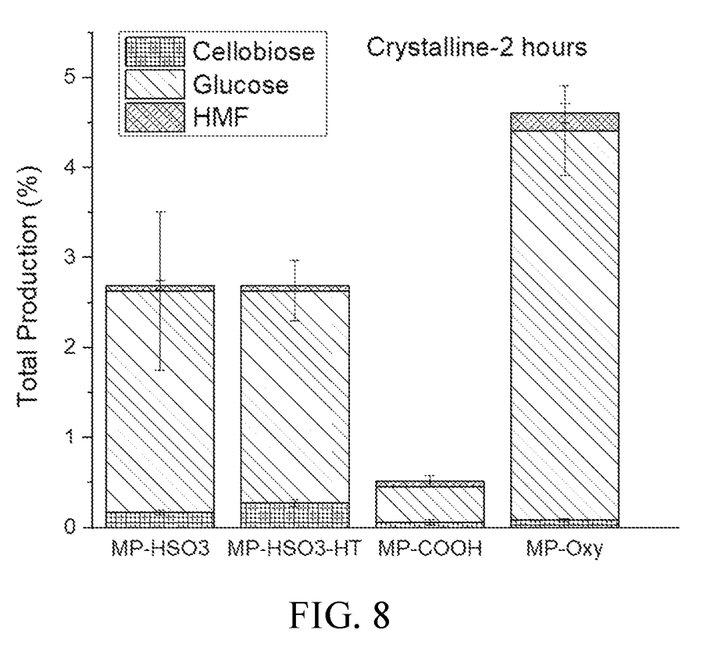
FIG. 8 shows the total production of crystalline celluslose hydrolysis with functional MP-based materials for 2 hours.
Figure 9:
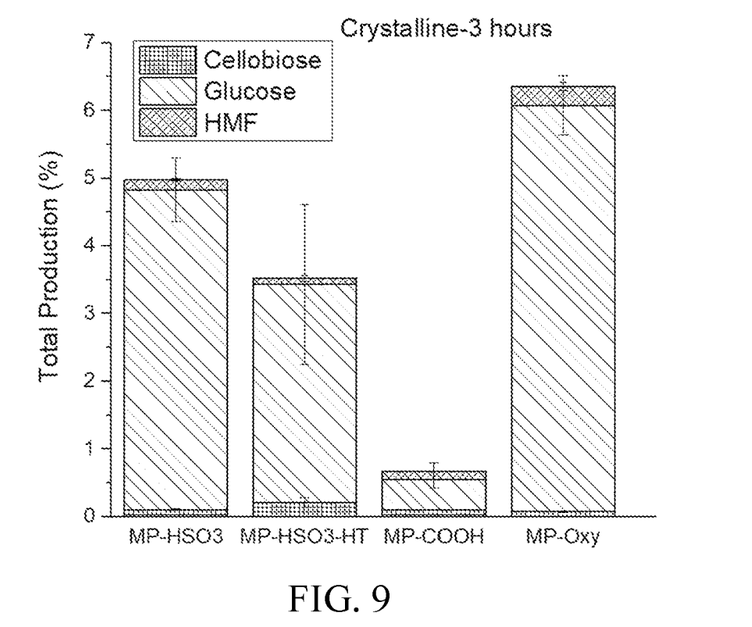
FIG. 9 shows the total production of crystalline celluslose hydrolysis with functional MP-based materials for 3 hours.
Figure 10:
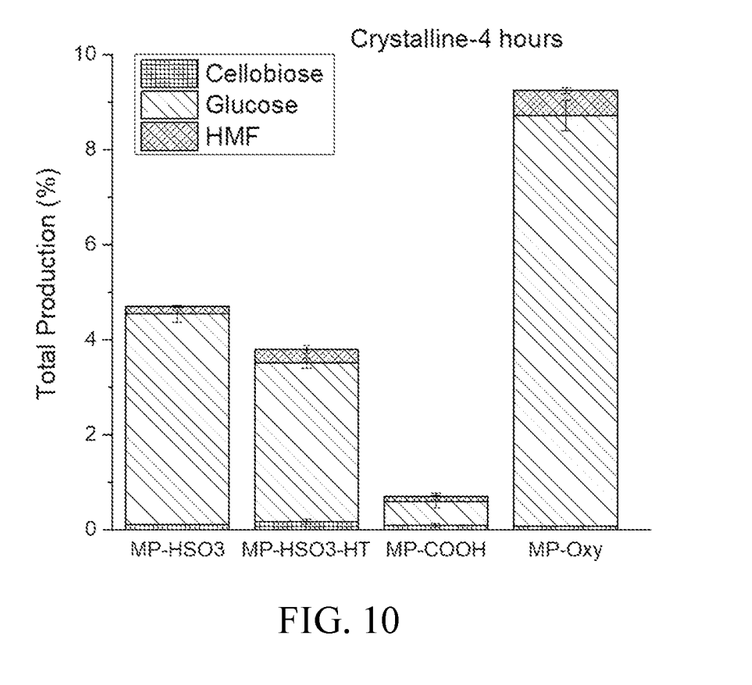
FIG. 10 shows the total production of crystalline celluslose hydrolysis with functional MP-based materials for 4 hours.
Figure 11:
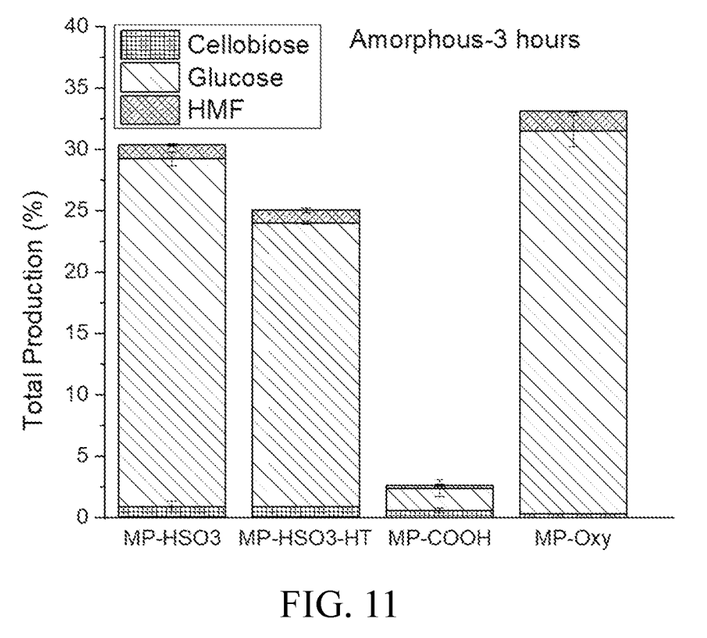
FIG. 11 shows the total production of amorphous celluslose hydrolysis with functional MP-based materials for 3 hours.
Figure 12:
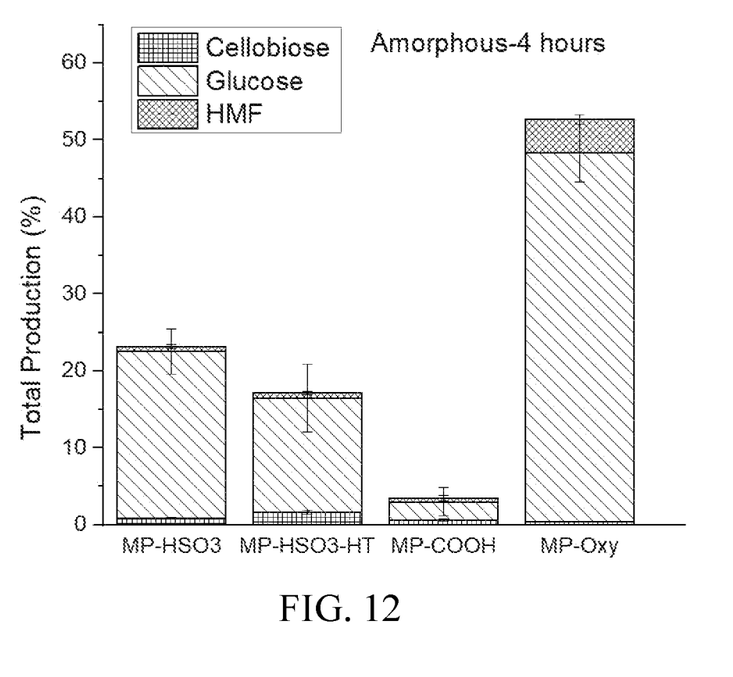
FIG. 12 shows the total production of amorphous celluslose hydrolysis with functional MP-based materials for 4 hours.
Figure 13:
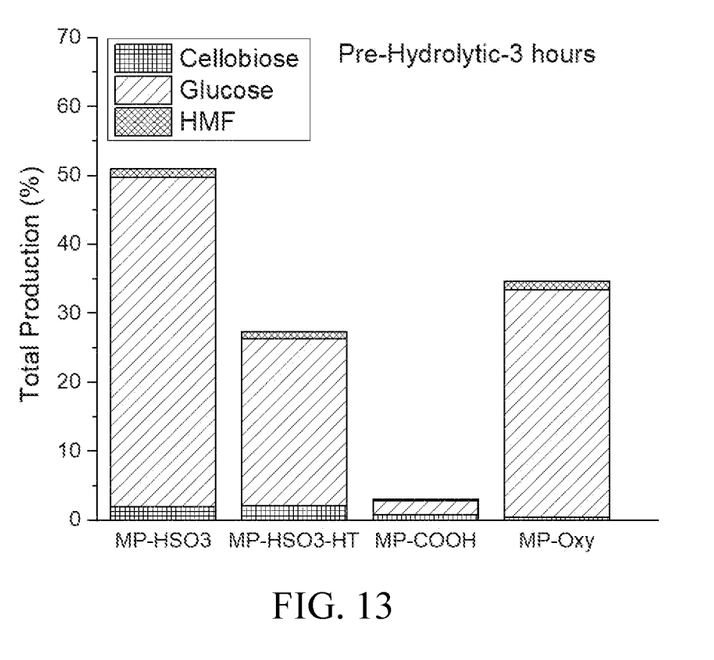
FIG. 13 shows the total production of pre-hydrolytic celluslose hydrolysis with functional MP-based materials for 3 hours.

In the analysis of Raman spectroscopy, the D band and the G band were observed at 1360 cm$^{-1}$ and 1585 cm$^{-1}$, respectively, as shown in FIG. 7. The D band at 1360 cm$^{-1}$ represents out of plane vibrations attributed to the presence of structural defects (sp$^3$), and the G band at 1585 cm$^{-1}$ is assigned to in-plane vibrations of sp$^2$ bonded carbon atoms. The analysis results showed that the ID/IG ratio of the non-functional material MP was 0.83, while the ID/IG ratios of MP-SO$_3$H (0.74) and MP-SO$_3$H-HT (0.88) were lower than those of MP-COOH (0.96) and MP-Oxy (0.97). Therefore, it can be confirmed that MP-SO$_3$H and MP-SO$_3$H-HT had more functional groups on the edge compared to MP-COOH and MP-Oxy.

Preparation of Amorphous Cellulose and Pre-Hydrolytic Cellulose

Amorphous cellulose was synthesized by rinsing 5 g of commercial microcrystalline cellulose (Avicel® PH-101) in 40 mL of concentrated HCl first, followed by the addition of 160 mL of cold HCl (pre-chilled in dry ice bath for 1.5 hours) for cellulose dissolution. The β-glucan/HCl solution was added into 1 L of cold acetone for the reprecipitation of a fluffy white solid directly, or after dissolution for 2 hours at room temperature (pre-hydrolytic cellulose). It was then separated by ultra-centrifuge at 4° C. at 15,000 rpm for 15 minutes, repeated three times. During the centrifuge processing, the solids were washed with cold acetone and stored at a low temperature environment to decrease the possibility that the hydrolysis of cellulose will produce unusably short β-glucan chains. The separated solid was dispersed in 1.5 L of cold DI water first, and then the white powder was filtrated out with PTFE filter paper and washed with cold DI water to achieve a neutral pH value. Furthermore, the synthesized amorphous cellulose was purified by Soxhlet extraction set-up with DI water for 24 hours and then freeze-dried for 3 days.

Hydrolysis of Cellulose

Cellulose Hydrolysis: Microcrystalline cellulose (Avicel® PH-101), amorphous cellulose or pre-hydrolytic cellulose (50 mg) were selected for hydrolytic depolymerization, with either (i) heterogeneous catalysts of MP or functional MPs (5 mg), MCN—$HSO_3$ (5 mg), commercially strong acidity resin of Amberlyst 15 (5 mg) or Nafion 50 (a bead around 40 mg) in DI water solution (2 mL) or (ii) homogeneous sulfuric acid aqueous solution (7.5 mN, 2 mL). The resulting suspension was placed in specialized high-pressure glass tubes (outer diameter: 1.9 cm, length: 6.0 cm), which contained a stir bar. The tubes were placed in a pre-heated heating block treated at 130, 150 or 180° C. for 2, 3, 4, 12, 24, or 48 hours, at autogenous pressure, under 400 rpm stirring. After the reaction, the tube was taken off the heating block for cooling. Spent mixture and filtrate were separately collected using SPE filtration assembly (200 mg/3 mL SPE column, Silica), and the filtrated mixture was subsequently washed with 75° C. water (8 mL) to completely remove residual saccharides or derivatives into pre-weighted 15 mL polypropylene tubes. The volume of filtrate (Vfiltrate) was derived from the division of the tube mass difference before and after filtration and the density of the water (1 $g/cm^3$) (Vfiltrate=(Mfull−Mempty)/(1 $g/cm^3$); Empty: empty tube mass; Mfull: tube mass after filtration). The concentration of filtrate was characterized by HPLC to evaluate the products generated from reactions and the weight percentage of cellulose converted. For control experiments, the reaction conditions were the same as aforementioned except that no catalyst was introduced.

The hydrolytic depolymerization results of three different types of cellulose, crystalline cellulose, amorphous cellulose, and pre-hydrolytic cellulose (50 mg) along with functionalized MP, MP-$SO_3$H, MP-$SO_3$H-HT, MP-COOH, and MP-Oxy (5 mg) were presented in FIGS. 8-13. The materials were reacted with three kinds of celluloses in a 2 mL aqueous solution at 180° C. for 2, 3 and 4 hours. The results showed that after the hydrolysis, three products were obtained: cellobiose, glucose, and HMF, with glucose being the main product after hydrolysis. As a result, it was found that MP-COOH had a lower glucose yield due to its relatively low acid sites density, while the MP-$SO_3$H and MP-$SO_3$H-HT had higher acid sites with strongly acidic functional groups concentrated on the edge of materials, thus promoting cleavage of the glycosidic bonds. In particular, MP-$SO_3$H reacts with pre-hydrolytic cellulose at 180° C. for 3 hours, obtaining the highest glucose yield of 44%. Only the MP-Oxy had a higher glucose yield as the reaction time increased.

Leaching Test

First, 3 mL of DI water was added into 7.5 mg of MP-based catalysts in a reaction tube, and the tube was heating at 180° C. for 3 hours. After the reaction, the solution was filtered by the 0.22 μm PTFE syringe filter, and 2 mL of the clear filtrate was added into 50 mg of cellulose in another reaction tube. The second reaction tube was processed at the corresponding temperature and time as the first reaction tube.

Figure 14:
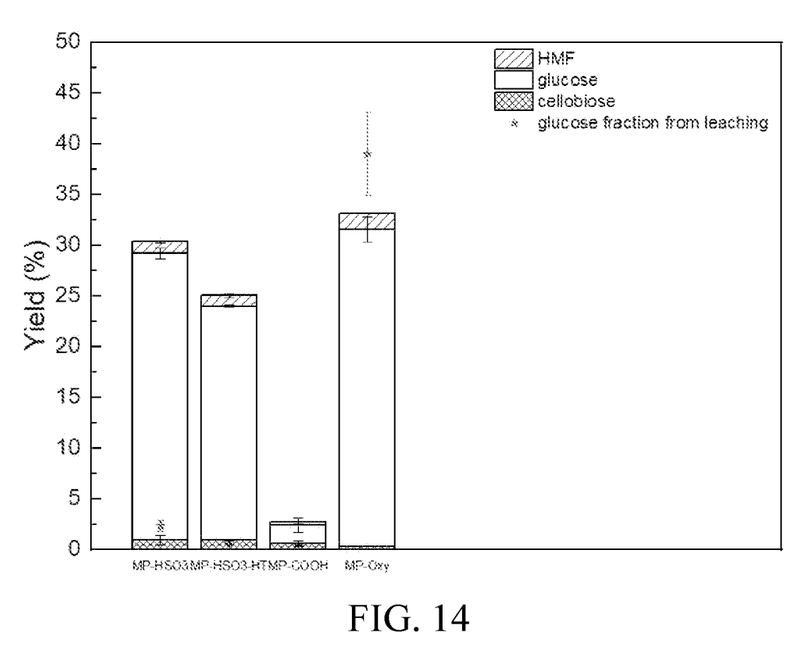
FIG. 14 shows the leaching test of amorphous cellulose with functional MP-based materials at 180° C. for 3 hours.

The results of leaching tests of amorphous cellulose with different catalysts at 180° C. for 3 hours were shown in FIG. 14. It can be seen that the glucose yields caused by leaching for MP-$SO_3$H, MP-$SO_3$H-HT and MP-COOH were 2.3%, 0.5% and 0.3%, respectively. The very low glucose production contribution by acidic leaching of these materials indicated that the cellulose hydrolysis was mainly caused from acidic functionalities on the edge of functional MP-based materials, whereas the glucose production caused by the acidic leaching of the MP-Oxy material was as high as 39%.

Comparison of Cellulose Hydrolysis Efficiency with Other Catalysts

Figure 15:
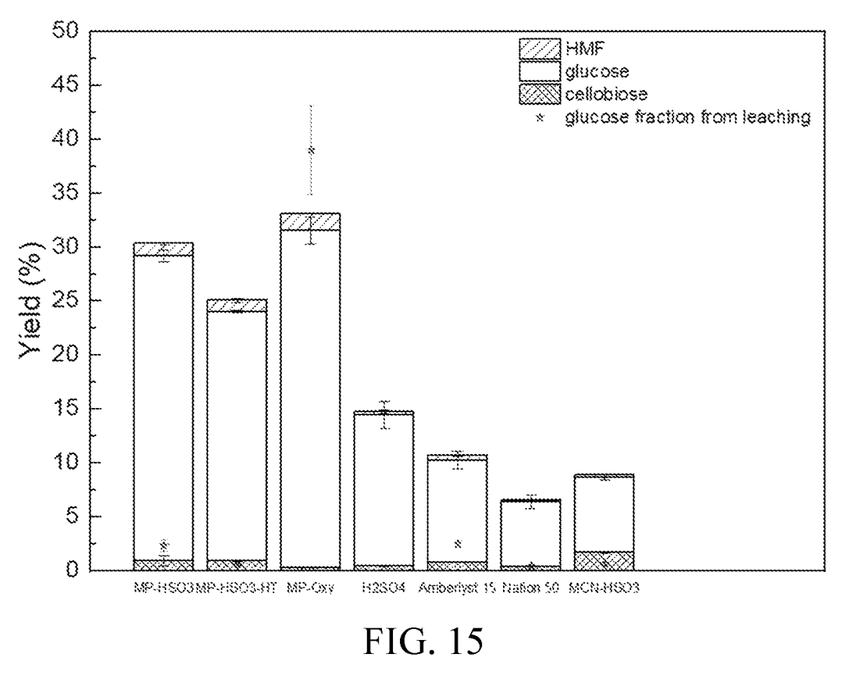
FIG. 15 shows cellulose hydrolysis efficiency for functional MP-based materials, $H_2SO_4$, Amberlyst 15, Nafion 50 and MCN—$HSO_3$.

The hydrolytic efficiencies of cellulose using MP-based catalysts were compared with other materials such as commercially strong acidic resin of Amberlyst® 15 hydrogen form (5 mg) or Nafion® NR50 (a bead around 40 mg), the sulfonated mesoporous carbon nanoparticle (MCN—$SO_3$H) and even homogeneous sulfuric acid aqueous solution (7.5 mN, 2 mL), as shown in FIG. 15. The results indicated that the Amberlyst 15 as a catalyst for hydrolysis with the amorphous cellulose at 180° C. for 3 hours resulted in a glucose yield of about 9.5%, while that of Nafion 50 as a catalyst is only about 5.9%. Although these commercial heterogeneous catalysts had strong acid groups on the surface could lead to high hydrolytic efficiency of cellulose, the location of these acidic groups on the surface might be very distant. Thus, the glucose production was 3-fold higher for functional MPs, although the leaching test of Amberlyst 15 and Nafion 50 gave the glucose yield of 2.5% and 0.4%, respectively. On the other hand, the heterogeneous catalyst MCN—$SO_3$H was used as a catalyst to obtain a glucose yield of 6.9%. The low glucose yield could be attributed to the lower acid surface coverage within porous channels, even leading to a glucose yield caused by material leaching of 0.6%. As for homogeneous sulfuric acid aqueous solution, which had equivalent acid amounts as MP-$SO_3$H, the hydrolytic efficiency of the homogeneous reaction was half lower than MP-$SO_3$H. Presumably, in the same aqueous solution, the MP-$SO_3$H had a high surface coverage of acidic that could make cellulose more efficient to break the glycosidic bond.

In the above examples, a series of mesophase pitch (MP)-based materials were synthesized with high surface coverage of acidic functionalities by chemical oxidation methods, including MP-$SO_3$H (treated with sulfuric acid), MP-$SO_3$H-HT (hydrothermal treated MP-$SO_3$H), MP-COOH (treated with nitric acid) and MP-Oxy (treated with sodium hypochlorite). Results of acid-base back titration indicated MP-$SO_3$H had the highest acid sites density (3.1 mmol/g), with major sulfonic acid of 1.5 mmol/g and lactones of 0.84 mmol/g. After hydrothermal treatments, the sulfonic groups decreased for MP-$SO_3$H-HT with more phenols generated. Specific surface areas of functional MP were lower than 56 $m^2/g$ by nitrogen sorption, indicating that these materials had nonporous structures. Nearby weak acid molecules on MP were similar to the enzyme for cellulose hydrolysis, which had the proximity of carboxylic groups in the active center, and might be a replacement catalyst for cellulose hydrolysis. Surprisingly, the highest $CO_2$ adsorption amounts (2.46 mmol/g) were observed for MP-$SO_3$H, which might have great potential in $CO_2$ sequestration and thus can serve as $CO_2$-capturing nonporous acid-functionalized sorbent.

The above examples are intended for illustrating the embodiments of the subject invention and the technical features thereof, but not for restricting the scope of protection of the subject invention. Many other possible modifications and variations can be made without departing from the spirit and scope of the invention as hereinafter claimed. The scope of the subject invention is based on the claims as appended.

What is claimed is:

1. A $CO_2$-capturing acid-functionalized adsorbent, comprising hexagonal carbon networks in a layered stacking structure and acidic functional groups bonded to the hexagonal carbon networks, wherein the hexagonal carbon networks substantially consist of aromatic carbons, and substantially all of the acidic functional groups are covalently linked to in-plane $sp^2$ carbons at edges of the hexagonal carbon networks.

2. The $CO_2$-capturing acid-functionalized adsorbent of claim 1, wherein the $CO_2$-capturing acid-functionalized adsorbent is in a nonporous structure.

3. The $CO_2$-capturing acid-functionalized adsorbent of claim 1, wherein the acidic functional groups include sulfonic, carboxyl, lactone and phenolic hydroxyl groups.

4. The $CO_2$-capturing acid-functionalized adsorbent of claim 1, wherein the $CO_2$-capturing acid-functionalized adsorbent is prepared by modifying a pitch-based material with the acidic functional groups.

5. The $CO_2$-capturing acid-functionalized adsorbent of claim 1, wherein the $CO_2$-capturing acid-functionalized adsorbent has an $I_D/I_G$ intensity ratio of not larger than 1 as measured by Raman spectroscopy.

6. The $CO_2$-capturing acid-functionalized adsorbent of claim 1, wherein the $CO_2$-capturing acid-functionalized adsorbent has a C1s/O1s ratio of not less than 3 as measured by X-ray photoelectron spectroscopy.

7. The $CO_2$-capturing acid-functionalized adsorbent of claim 1, wherein the $CO_2$-capturing acid-functionalized adsorbent has a total acid site density of 1.5 mmol/g or more.

8. The $CO_2$-capturing acid-functionalized adsorbent of claim 1, wherein the $CO_2$-capturing acid-functionalized adsorbent has an interlayer spacing in a range of from 0.34 nm to 0.37 nm as measured by X-ray diffraction.

9. The $CO_2$-capturing acid-functionalized adsorbent of claim 3, wherein the $CO_2$-capturing acid-functionalized adsorbent comprises the sulfonic groups in a density of 0.8 mmol/g or more, the phenolic hydroxyl groups in a density of 0.5 mmol/g or more, the carboxyl groups in a density of 0.1 mmol/g or more, and the lactone groups in a density of 0.4 mmol/g or more.

* * * * *